(12) United States Patent
Bosche

(10) Patent No.: US 7,246,991 B2
(45) Date of Patent: Jul. 24, 2007

(54) WIND TURBINE BLADE DEFLECTION CONTROL SYSTEM

(76) Inventor: John Vanden Bosche, 17405 NE. 131 St., Redmond, WA (US) 98052

(*) Notice: Subject to any disclaimer, the term of this patent is extended or adjusted under 35 U.S.C. 154(b) by 964 days.

(21) Appl. No.: 10/253,134

(22) Filed: Sep. 23, 2002

(65) Prior Publication Data

US 2004/0057828 A1    Mar. 25, 2004

(51) Int. Cl.
*F03D 7/00* (2006.01)
(52) U.S. Cl. ........................... 415/14; 415/118
(58) Field of Classification Search .................. 415/14, 415/33, 118, 4.1, 132 B, 61, 31
See application file for complete search history.

(56) References Cited

U.S. PATENT DOCUMENTS

| | | | |
|---|---|---|---|
| 3,515,485 A * | 6/1970 | Frank | ...................... 356/141.2 |
| 6,361,275 B1 | 3/2002 | Wobben | |
| 6,619,918 B1 | 9/2003 | Rebsdorf | |
| 7,052,232 B2 * | 5/2006 | Wobben | ...................... 415/118 |
| 2002/0000723 A1 | 1/2002 | Weitkamp | |
| 2003/0127862 A1 | 7/2003 | Weitkamp | |

FOREIGN PATENT DOCUMENTS

WO    WO 0133075 A1 *    5/2001
WO    WO 0202936 A1 *    1/2002

* cited by examiner

*Primary Examiner*—Edward K. Look
*Assistant Examiner*—Dwayne J White
(74) *Attorney, Agent, or Firm*—John Vanden Bosche

(57) ABSTRACT

A wind turbine with a sensor that measures the out-of-plane deflection of the blades and a controller that uses the signal from the sensor to determine the risk of a tower strike. The controller takes any necessary action to prevent a tower strike when it determines that the risk of a strike is high. The sensor can include strain gages or accelerometers mounted on the blades or it can include a fixed sensor mounted on the side of the tower to measure tower clearance as the blade passes by. The control action taken can include pitching blades, yawing the nacelle, or stopping the turbine. The controller is preferably a fuzzy logic controller.

11 Claims, 3 Drawing Sheets

WIND TURBINE BLADE DEFLECTION CONTROL SYSTEM

BACKGROUND OF THE INVENTION

This invention relates to a control system for wind turbines and particularly to a control system that limits blade deflection to avoid tower strikes.

Wind turbines have long been used to generate electricity from the wind. The most common type of wind turbine is the horizontal axis turbine. Horizontal axis wind turbines have one or more blades (but most commonly 2 or 3 blades) attached to a shaft that rotates about a horizontal axis. On the opposite end of the shaft from the blades is a gearbox and generator. When wind passes over the blades, the shaft rotates and the generator makes electricity. Such wind turbines have been extensively used in California for the past 20 years and are being installed in large numbers all around the world.

One of the primary concerns in the design of a wind turbine is the cost of energy. In order to keep the cost of energy low the turbine must be rugged and reliable and have a low maintenance cost. Wind turbine manufacturers have improved the cost of energy by increasing the size of their wind turbines. Over the past 20 years, wind turbines on the commercial market have increased from approximately 50 kW in the early 1980s to nearly 2 MW today. As the turbine size and blade length increase, blade deflection becomes a more important issue. Some large wind turbines have been known to experience tower strikes in which a blade deflects to the point that it strikes the tower and is destroyed. Furthermore, many wind turbine manufacturers are reducing the cost of their wind turbines by making the blades lighter weight. This results in a more flexible blade and exacerbates the tower strike issue. Several wind turbine designs, such as those described in U.S. Pat. Nos. 4,352,629, 6,327,957 and 5,584,655 (all of which are incorporated herein by reference) describe highly flexible wind turbine blades. These highly flexible designs may become more common in the future as turbine designers strive to reduce the cost of energy even further. For flexible wind turbine blades to be successful on a large wind turbine, it is necessary to have a system to prevent tower strikes.

SUMMARY OF THE INVENTION

According to the present invention a sensor detects the blade deflection. The sensed blade deflection is compared to an operating envelope in which a tower strike will not occur. If the blade deflection approaches the edge of the operating envelope and a tower strike becomes possible, then a control action is taken to avoid the strike.

The sensor used for detecting blade deflection can include strain gages mounted in the blades, accelerometers mounted in the blades, or a stationary sensor mounted on the tower to detect the blade passage distance. The strain gage or accelerometer sensors would be mounted in the blade to monitor out-of-plane blade motion. The output from the sensors would be integrated to keep track of the blade tip position at all times. A stationary sensor on the tower could include an ultrasonic, laser, or radar sensor that measures the blade passage distance each time a blade passes by the tower. The blade passage distance could be different for each blade, so the controller must keep track of the deflection of each blade separately.

Each of the above types of sensors has advantages and disadvantages. The strain gage and accelerometer approaches have the advantage that they track blade position all the time and can be used to monitor blade loads as well as deflection. A system that measures blade load is described in WIPO patent application WO 01/33075 (which is incorporated herein by reference). However, the signal from the strain gage or accelerometer can tend to drift and any small error in the signal will be compounded as the signal is integrated over time. Therefore, the best solution may be a combination of a strain gage or accelerometer in the blade combined with a stationary sensor on the tower that is used to "zero" the output from the strain gages or accelerometer once per blade revolution.

The controller of the present invention uses the output from the blade deflection sensor to determine if the blade is in danger of striking the tower. If the controller determines that a tower strike is possible, then it takes some control action to avoid a tower strike. The control action could take several possible forms. The controller could pitch the blades if the turbine is a variable pitch machine. If the blades are independently pitchable, then the preferred method is to pitch only the blade or blades that are in danger of a tower strike. Some wind turbines utilize ailerons or partial span pitch rather than full span pitch, and the same control objectives can be met using the aileron or partial span pitch rather than the full span pitch. If the wind turbine has fixed pitch blades, then it may be possible to yaw the turbine in order to avoid a tower strike. Yawing the turbine takes the rotor out of the wind and reduces loads on the blades. Yawing can also cause gyroscopic loads on the blades that tend to deflect them toward or away from the tower. Of course, it would be necessary to yaw the turbine in the appropriate direction in order to deflect the blades away from the tower using gyroscopic forces. A final control action that could be taken is to apply the brakes and stop the wind turbine entirely. Almost all wind turbines have emergency stopping and normal stopping procedures. Depending on the severity of the risk of a tower strike, the controller would determine whether a normal or emergency stop is necessary.

DETAILED DESCRIPTION OF THE INVENTION

Figure 1:
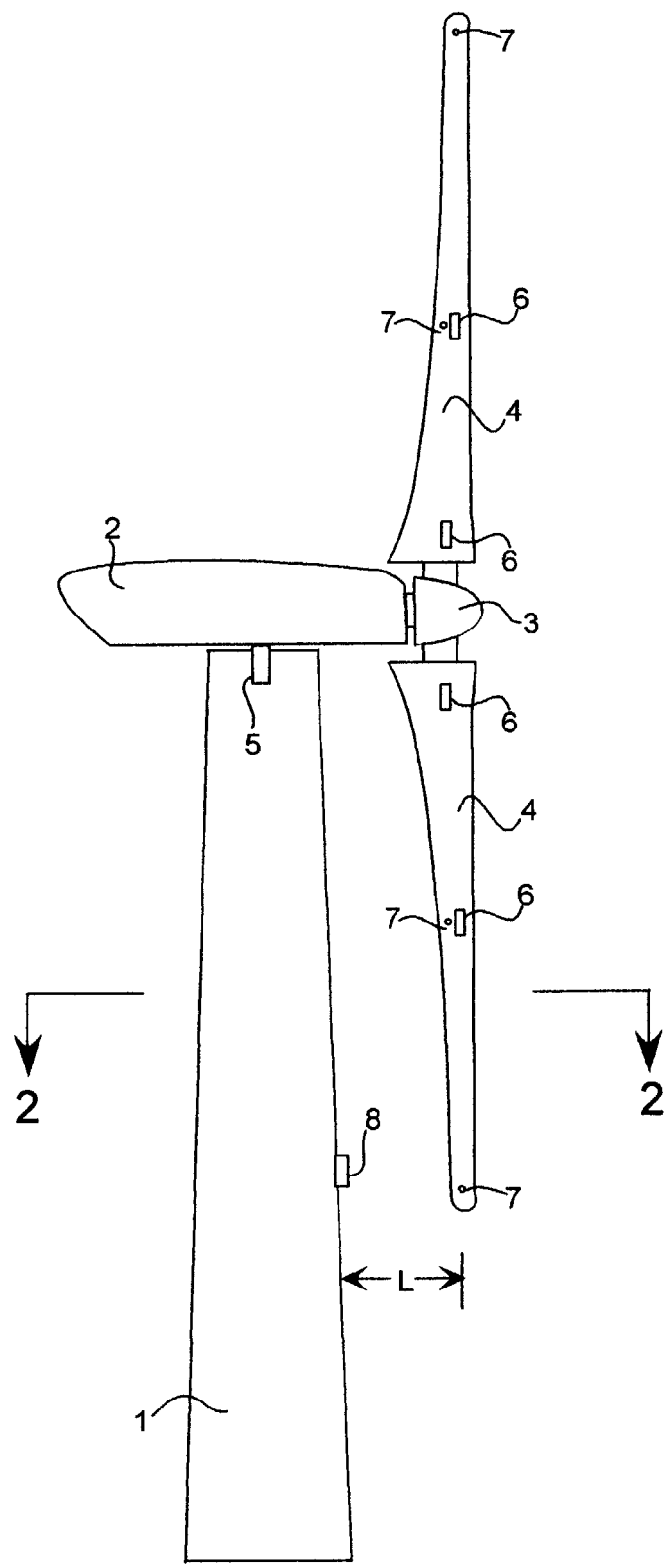
FIG. 1 shows a perspective view of a wind turbine according to the present invention.

The wind turbine of the present invention is shown in FIG. 1 and includes a tower 1 with a nacelle 2 at the top of the tower 1. The nacelle 2 contains the main shaft, associated bearings, the gearbox, the generator, and any associated hydraulic or control equipment that is necessary. Each wind turbine includes different components in the nacelle 2 and these components are not shown in FIG. 1 because they do not form a part of the present invention. Attached to the nacelle 2 is a hub 3 with blades 4 attached to the hub for rotation therewith relative to the nacelle 2. The wind turbine can include any number of blades 4, although two or three blades tend to be the most common number of blades on most commercially available wind turbines. Furthermore, the blades 4 may be oriented so that they are either upwind or downwind of the tower 1 during operation. The present invention is more critical for wind turbines with an upwind configuration, although downwind turbines have been known to experience tower strikes as well.

The nacelle 2 includes a yaw drive 5 that orients the nacelle 2 so that the blades 4 are perpendicular to the prevailing wind. A wind direction sensor is included on the nacelle 2 to detect the wind direction and the wind turbine includes a controller that activates the yaw drive 5 in response to the signal from the wind direction sensor.

As the blades 4 rotate, they move around a path that includes a lowermost position. As the blades pass through their lowermost position, they are separated from the tower 1 by a tower clearance distance L as shown in FIG. 1. The blades tend to deflect in an out-of-plane direction in response to wind speed variations and structural response. As the blades deflect, their tower clearance L varies. The tower clearance L can be different for each blade if there is a difference in blade pitch, blade surface cleanliness, or structural dynamic response between the blades.

The wind turbine according to the present invention includes a sensor for measuring the tower clearance L for each blade passage. The sensor can be any suitable type of sensor for detecting the clearance. Several possible sensor types are shown in FIG. 1.

The blades 4 could incorporate strain gages 6 that are molded into the blades during their manufacturing process. The strain gages could be placed near the root of the blade or at an antinode for higher order eigenfrequencies. The best solution could be two or three sets of strain gages at the blade root and the anti-notes for the first two or three eigenfrequencies. The number and location of the strain gages would depend on the specific blade design and one of ordinary skill in the art would be able to select a suitable placement for the gages. The controller according to the present invention would record the output from the strain gages 6 and calculate a blade deflection that is proportional to the output of the strain gages. Any drift or other inaccuracy in the signals from the strain gages 6 will cause an error in sensing the blade deflection. A small error in detecting the deflection can be disastrous because it can mean the difference between avoiding a tower strike and not avoiding it. Therefore, it is necessary to have a technique for calibrating and zeroing the strain gage signals. An example of such a strategy is described below. One of ordinary skill in the art would be able to conceive of other such techniques.

Instead of, or in addition to, using strain gages 6 mounted in the blades 4, it is possible to use accelerometers 7 mounted in the blades 4 in order to sense the blade deflection. The accelerometer is preferably mounted at the blade tip, although additional accelerometers may be desirable at anti-nodes for higher order eigenfrequencies. The controller according to the present invention records the output of the accelerometers 7 in order to determine the motion of the blade. Since the accelerometers 7 record acceleration, their signal must be integrated over time in order to determine the blade deflection. Any error, therefore, in the accelerometer signal will be compounded as it is integrated over time. This makes calibration and zeroing of the accelerometer extremely important. In selecting an appropriate accelerometer to use in this application, it is important to choose a sensor with good response at low frequency. It is also important to select a sensor that is relatively insensitive to off-axis response and crosstalk.

Figure 2:
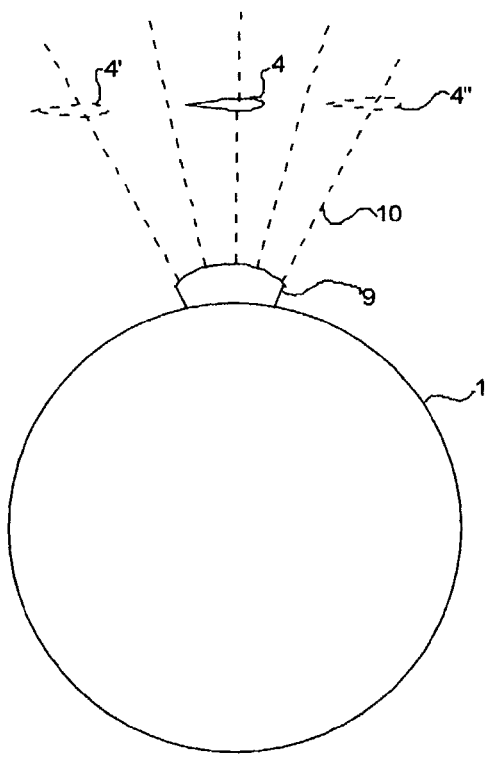
FIG. 2 shows a cutaway view of a wind turbine according to the present invention taken along lines 2-2 in FIG. 1.
Figure 3:
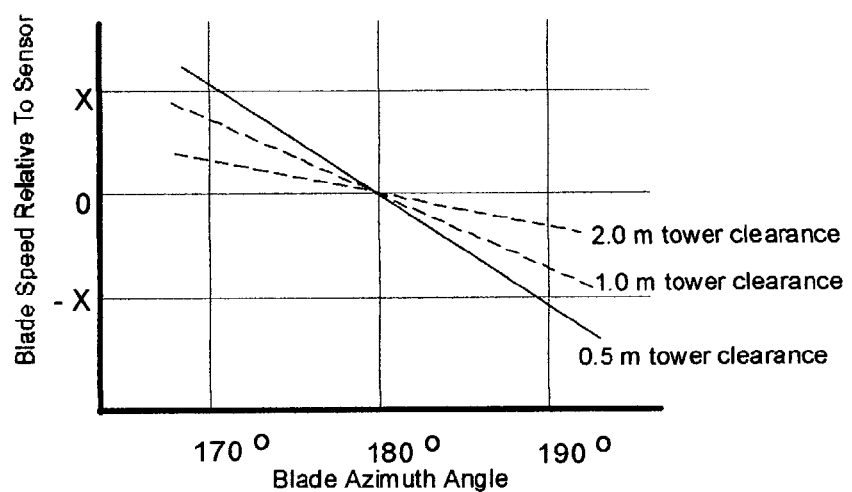
FIG. 3 shows the output of a radar-based tower strike sensor used in one embodiment of the present invention.

Rather than sensing the blade deflection around the entire rotation, it is possible to measure the deflection only as the blade passes the tower. In this scenario, a stationary sensor 8 is located on the tower that measures the blade clearance L as the blade passes its downward position. Such a sensor must be synchronized to measure the clearance L at precisely the correct moment. Therefore, the wind turbine must include a sensor on the hub 4 or shaft that indicates the azimuth position of the rotor. The actual sensor 8 that measures blade clearance can be any suitable type of sensor. It can be a laser device or an untrasonic sensor that measures the distance between the sensor and the object being sensed. A preferred embodiment of the tower clearance sensor is shown in FIG. 2. The sensor in FIG. 2 includes a radar device 9 that emits radar beams 10 and detects reflections of the beams 10. A blade 4 is shown passing by the tower 1. The radar detects a Doppler shift in the reflected beam 10 that is proportional to the velocity of the blade 4 in the direction of the radar device 9. As the blade 4 passes by the tower 1, the velocity of the blade 4 is entirely perpendicular to the radar beam 10 and so no Doppler shift is detected. The blade 4 is shown in an alternate position where it is approaching the tower and is marked as element 4'. In this position, the radar device 9 detects a doppler shift proportional to the speed of the blade in the direction of the device. The blade 4 is also shown in another alternate position where it is retreating from the tower and is marked as element 4". In this position, the radar device 9 detects a doppler shift proportional to the speed of the blade in the direction of the device but with an opposite sign. The resulting signal from the radar device is a signal that changes with blade azimuth position as shown in FIG. 3. The radar signal changes approximately linearly with blade azimuth position and crosses through zero as the blade is vertical. The slope of the line indicates the distance between the blade and the tower. FIG. 3 shows three hypothetical outputs from the radar device corresponding to three blade clearance distances. The actual slope and shape of the radar signal would need to be determined empirically for any specific wind turbine design. This would be a relatively easy task for one of ordinary skill in the art.

Each of the above described blade deflection sensors has advantages and disadvantages. The preferred best mode for the invention is to combine the strain gage sensor and the radar sensor. The strain gage sensor provides an indication of the blade deflection as the blade travels around a revolution and the radar sensor is used once per revolution to provide a known blade position and "zero" the signal from the strain gages.

Figure 4:
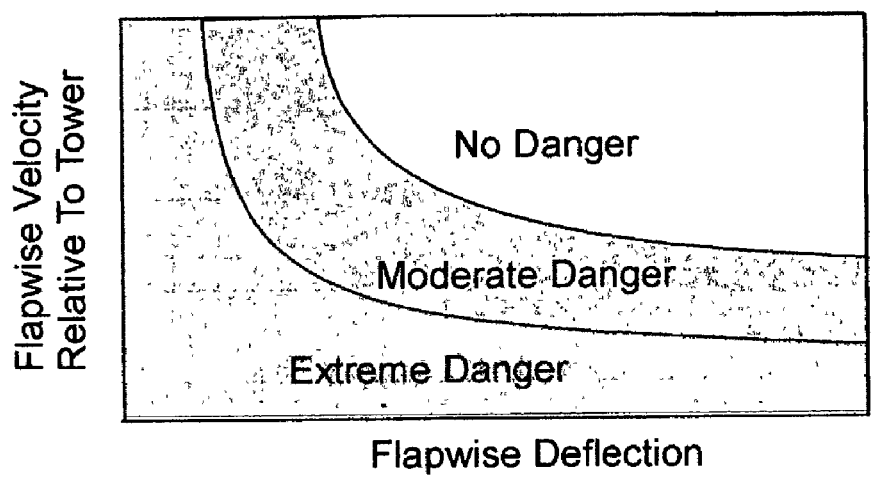
FIG. 4 shows an operating map used by the controller of the present invention.

Once the blade deflection has been measured, the controller according to the present invention compares the deflection to a predetermined operating envelope to determine if there is a risk of a tower strike. It may be necessary to keep track of the blade position over several revolutions in order to determine if the blade is moving closer to the tower. The blade's out-of-plane deflection and velocity are compared to an operating envelope as shown in FIG. 4. The operating envelope includes regions of various danger levels. For instance, as shown in FIG. 4, there is a region of extreme danger when the blade deflection places the blade very close to the tower or when a combination of deflection and velocity indicate that the blade is moving toward the tower. The actual operating envelope would be different for every wind turbine depending on structural dynamics and aerodynamics. One of ordinary skill in the art would be able to develop a suitable operating envelope for a specific wind turbine.

Based on the blade's state within the operating map, the controller assigns a level of danger of a tower strike. The assignment of tower strike risk is preferably performed by a fuzzy logic controller, although a simple lookup table could be sufficient.

Once the level of tower strike risk has been assessed, the controller takes the appropriate action. If there is little or no danger of a tower strike, then the controller simply takes no action and the wind turbine continues to operate. If there is a moderate risk of a tower strike, then the controller may give a measured response such as slowly pitching the blades, slowly yawing the nacelle, or applying a non-emergency stop. If the controller detects an extreme risk of a tower strike, then the controller would take a more drastic action such as rapidly pitching the blades or yawing the nacelle or applying the turbine's emergency brake system. A fuzzy logic controller is preferably used to determine the appropriate control action, although any suitable control algorithm could work.

Another potential use for the invention would be to measure blade deflection and infer blade flapwise bending stress from the measured blade deflection. The turbine could then be controlled to minimize blade stress or to maintain the stress below a specified level. Control actions could include changing the blade pitch, changing the rotor speed, deploying ailerons or brakes, or stopping the turbine. Empirical loads data would be necessary for each turbine design to derive the correlation between flapwise bending stress and out-of-plane blade deflection. This correlation will change as the blade pitch angle is changed. The level of allowable stress should be selected so that the fatigue life of the wind turbine will be sufficiently long. This could include a calculation of fatigue damage rate from the measured stress in real-time, preferably using a rainflow counting technique, and comparing the measured fatigue damage rate to an allowable rate that provides an adequately long fatigue life. The allowable stress levels and fatigue rate would be based on turbine specific design information such as material property, blade geometry, and stress concentrations. One of ordinary skill in the art would be able to select an appropriate allowable stress level and fatigue damage rate.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

I claim:

1. A wind turbine comprising:
    a tower;
    a rotor mounted on top of said tower with at least one blade that rotates about a substantially horizontal axis;
    a sensor that measures the out-of-plane deflection of said blade; and
    a controller that uses the out-of-plane deflection measurement from said sensor to determine a clearance between said blade and said tower wherein said controller performs a control action when there is a danger of said blade striking said tower to prevent said blade from striking said tower.

2. The wind turbine of claim 1 wherein said sensor further comprises a stationary sensor mounted on said tower to measure the clearance between said blade and said tower.

3. The wind turbine of claim 2 wherein said sensor is an ultrasonic sensor.

4. The wind turbine of claim 2 wherein said sensor is a laser sensor.

5. The wind turbine of claim 2 wherein said sensor is a radar sensor.

6. The wind turbine of claim 1 wherein said controller is a fuzzy logic controller.

7. The wind turbine of claim 1 wherein said wind turbine further comprises a mechanism for adjusting the pitch angle of said blade and wherein said control action includes changing said pitch angle.

8. The wind turbine of claim 1 wherein said wind turbine further comprises a yaw drive for orienting said rotor relative to the prevailing wind direction and wherein said control action includes activating said yaw drive to yaw said rotor out of the wind.

9. The wind turbine of claim 1 wherein said control action includes stopping said wind turbine.

10. A method of controlling a wind turbine comprising:
    providing a tower;
    providing a rotor on top of said tower with at least one blade that rotates about a substantially horizontal axis;
    providing a sensor that measures the out-of-plane deflection of said blade wherein said sensor comprises an accelerometer affixed to said blade;
    providing a controller that determines the level of risk of said blade striking said tower; and
    performing a control action to prevent said blade from striking said tower.

11. A method of controlling a wind turbine comprising:
    providing a tower;
    providing a rotor on top of said tower with at least one blade that rotates about a substantially horizontal axis;
    measuring the out-of-plane deflection of said blade using an accelerometer affixed to said blade;
    inferring blade flapwise bending stress from blade out-of-plane deflection measurements; and
    performing a control action as necessary to maintain blade flapwise bending stress within predetermined limits.

* * * * *